United States Patent [19]
Delnick et al.

[11] Patent Number: 5,510,212
[45] Date of Patent: Apr. 23, 1996

[54] STRUCTURAL MICRO-POROUS CARBON ANODE FOR RECHARGEABLE LITHIUM ION BATTERIES

[76] Inventors: Frank M. Delnick, 12301 Oakland NE., Albuquerque, N.M. 87122; Narayan Doddapaneni, 10516 Royal Birkdale NE, Albuquerque, N.M. 87111; Robert R. Lagasse, 1237 Sasebo, NE., Albuquerque, N.M. 87112; Ronald F. Simandl, 308 Big Tree Dr., Farragut, Tenn. 37922; D. Gerald Glasgow, 361 S. Village Dr., Centerville, Ohio 45459; Alan Sylwester, 2801 New Mexico Ave., NW. #922, Washington, D.C. 20007

[21] Appl. No.: 350,281
[22] Filed: Dec. 2, 1994

Related U.S. Application Data

[63] Continuation of Ser. No. 4,720, Jan. 13, 1993, abandoned.
[51] Int. Cl.$^6$ .................................................... H01M 4/36
[52] U.S. Cl. ................................. 429/218; 264/29.7
[58] Field of Search ............................. 429/218; 264/29.7

[56] References Cited

U.S. PATENT DOCUMENTS

| | | |
|---|---|---|
| 4,304,825 | 12/1981 | Basu . |
| 4,423,125 | 12/1983 | Basu . |
| 4,522,953 | 6/1985 | Barby et al. . |
| 4,536,521 | 8/1985 | Haq . |
| 4,611,014 | 9/1986 | Jomes et al. . |
| 4,668,595 | 5/1987 | Yoshino et al. . |
| 4,702,977 | 10/1987 | Hiratsuka et al. . |
| 4,749,514 | 6/1988 | Murakami et al. . |
| 4,775,655 | 10/1988 | Edwards et al. . |
| 4,832,881 | 5/1989 | Arnold, Jr. et al. ............... 264/29.7 |
| 4,863,814 | 9/1989 | Mohri et al. . |
| 4,863,818 | 9/1989 | Yoshimoto et al. . |
| 4,945,014 | 7/1990 | Miyabayashi et al. . |
| 4,959,281 | 9/1990 | Nishi et al. . |
| 4,968,527 | 11/1990 | Yoshimoto et al. . |
| 4,980,250 | 12/1990 | Takahashi et al. ............... 429/218 X |
| 5,021,462 | 6/1991 | Elmes et al. . |
| 5,028,500 | 7/1991 | Fong et al. . |

FOREIGN PATENT DOCUMENTS

| | | |
|---|---|---|
| 220216 | 8/1989 | Japan . |
| 1294372 | 4/1991 | Japan . |

*Primary Examiner*—John S. Maples
*Attorney, Agent, or Firm*—Timothy D. Stanley; Gregory A. Cone; Kurt C. Olsen

[57] ABSTRACT

A secondary battery having a rechargeable lithium-containing anode, a cathode, and a separator positioned between the cathode and anode with an organic electrolyte solution absorbed therein is provided. The anode comprises three-dimensional microporous carbon structures synthesized by the controlled pyrolysis of gel derived polymer foam precursors. The gradual heating process in the carbonization of pretreated foam precursors stabilizes the pore structures in the pretreated foam.

6 Claims, 3 Drawing Sheets

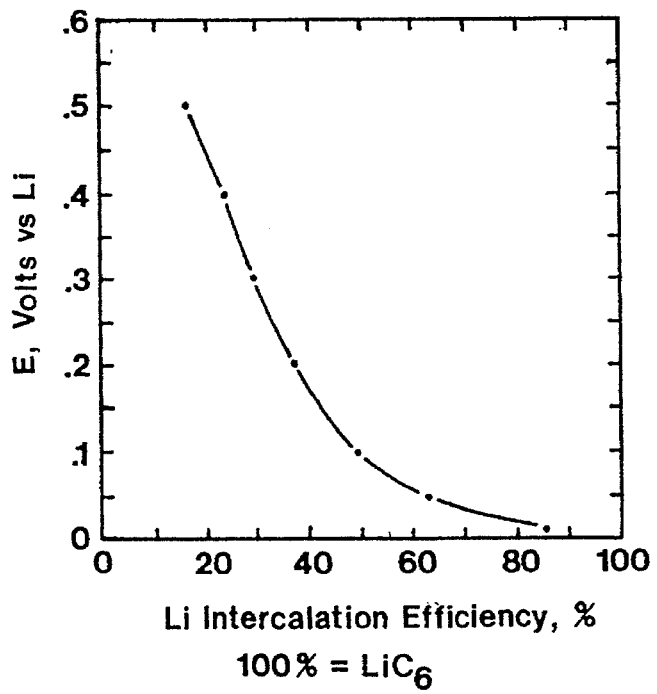
FIG._1.
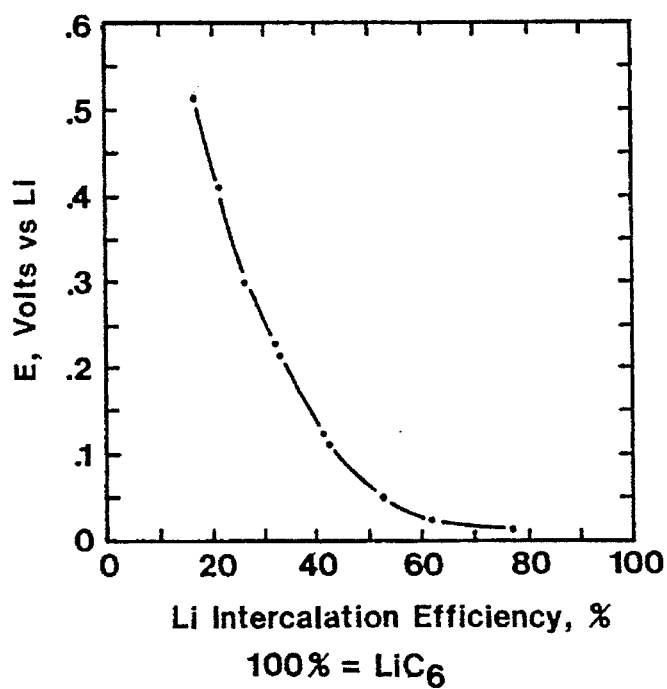
FIG._2.

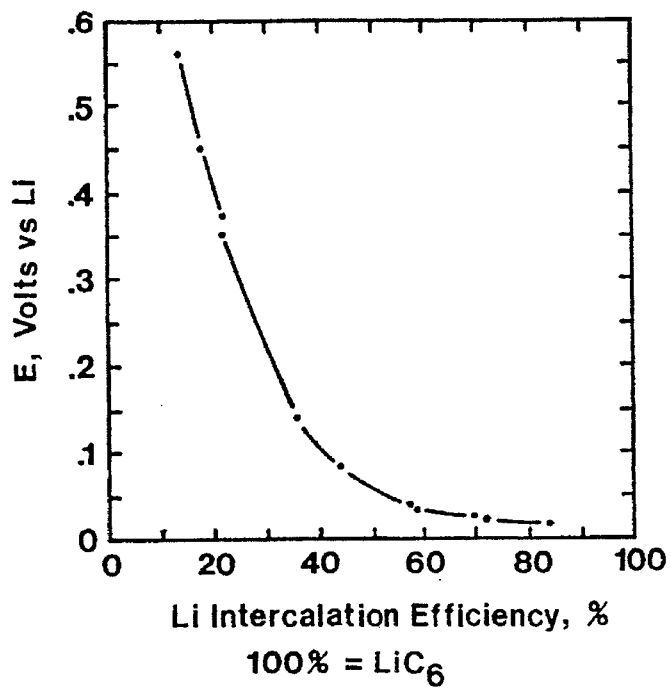
FIG._3.
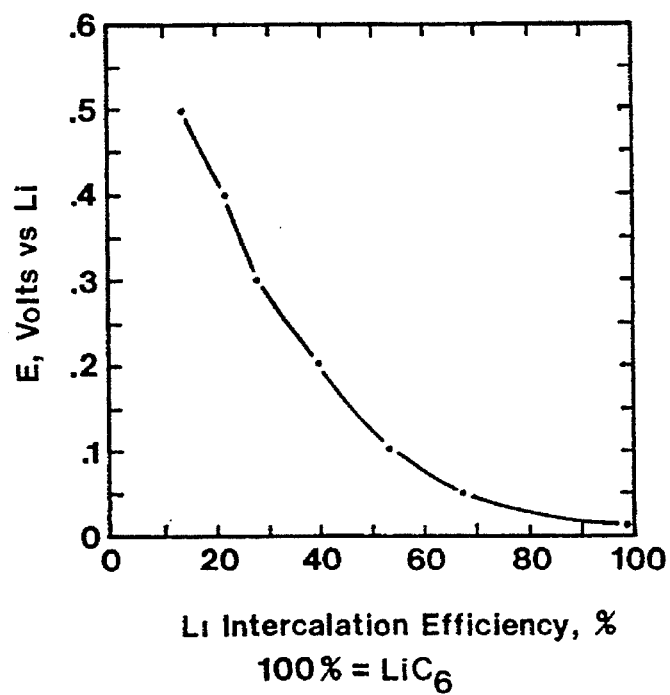
FIG._4.

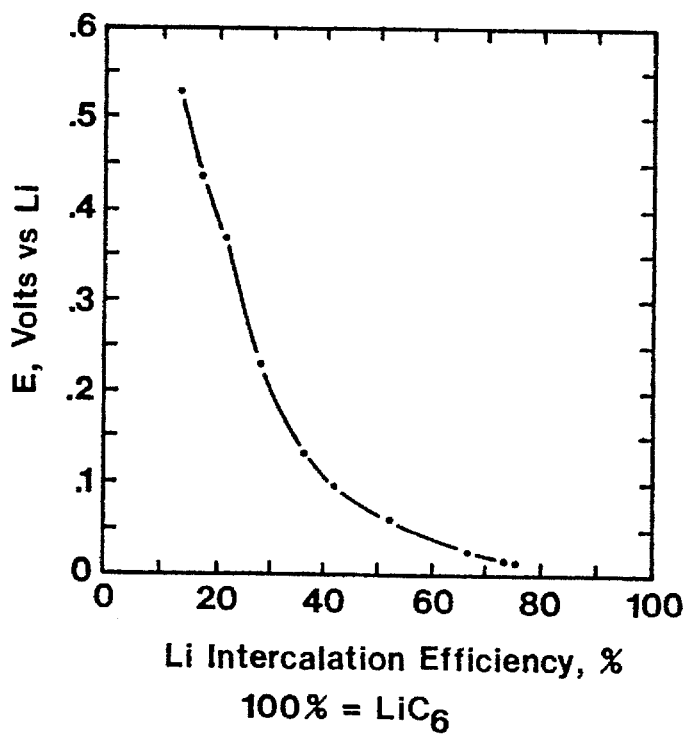
FIG._5.
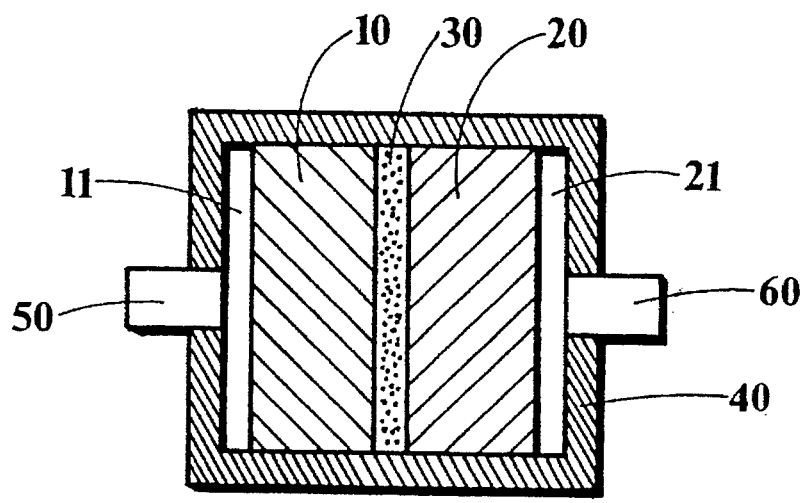
FIG._6.

STRUCTURAL MICRO-POROUS CARBON ANODE FOR RECHARGEABLE LITHIUM ION BATTERIES

This is a continuation of application Ser. No. 08/004,720 filed Jan. 13, 1993, now abandoned.

FIELD OF THE INVENTION

This invention relates to non-aqueous secondary batteries and more particularly to rechargeable lithium-ion batteries employing rechargeable carbon anodes made from gel derived polymeric foam precursors, wherein the carbon anode can be reversibly intercalated with lithium.

The United States Government has rights in this invention pursuant to contract DE-AC04-76DP00789 awarded by the Department of Energy to American Telephone & Telegraph Co.

BACKGROUND OF THE INVENTION

Secondary or rechargeable batteries are used in a variety of applications, but the secondary battery market is coming under increased attack by environmental concerns. Indeed, the principal consumer rechargeable battery, the nickel-cadmium battery, has limited future utility because of growing governmental regulatory pressures. Current alkali metal batteries have not been used extensively as secondary batteries because of their limited cycle life.

Conventional secondary, non-aqueous lithium cells typically include an anode of metallic lithium, a lithium electrolyte prepared from a lithium salt dissolved in one or more organic solvents, and a cathode of an electrochemically active material, typically a chalcogenide or oxide of a transition metal. During discharge, lithium ions from the anode pass through the liquid electrolyte to the electrochemically active material of the cathode where the ions are taken up with the simultaneous release of electrical energy. During charging, however, the flow of ions is reversed so that lithium ions pass from the electrochemically active cathode material through the electrolyte and are plated back onto the lithium anode. During each discharge/charge cycle small amounts of lithium and electrolyte are consumed by chemical reactions at newly created surfaces. As lithium inherently tends to form high surface area peaks or dendrites as it is plated back onto the anode, this reactive condition is aggravated. Furthermore, the dendritic peaks continue to grow until they eventually contact the cathode which causes the cell to fail before the useful lifetime is realized.

In an attempt to solve these problems, carbonaceous material as lithium intercalation anodes in secondary lithium-ion batteries have been introduced. Yoshiro et al., U.S. Pat. No. 4,668,595, issued May 26, 1987; Basu, U.S. Pat. No. 4,423,125, issued Dec. 27, 1983; and Basu, U.S. Pat. No. 4,304,825, issued Dec. 8, 1981. Carbon anodes have been synthesized from various organic compounds by vapor phase pyrolysis. In this process molecules are vaporized in flowing argon or nitrogen and then pyrolyzed onto an anode substrate. Benzene is a preferred organic precursor and some benzene derived anodes have exhibited up to approximately 86% lithium utilization efficiency ($Li_{0.86}C_6$) through approximately 100 cycles. Mohri et al., U.S. Pat. No. 4,863,814, issued Sep. 5, 1989; Yoshimoto et al., U.S. Pat. No. 4,863,818, issued Sep. 5, 1989; and Yoshimoto et al., U.S. Pat. No. 4,968,527, issued Nov. 6, 1990. Carbonaceous anodes can also be formed by condensed phase pyrolysis of individual organic compounds. Hiratsuka et al., U.S. Pat. No. 4,702,977, issued Oct. 27, 1987. Alternatively, the carbonaceous materials can be blended with powdered metals that alloy with lithium. Miyabayashi et al., U.S. Pat. No. 4,945,014, issued Jul. 31, 1990. See also Murakami et al., U.S. Pat. No. 4,749,514, issued Jun. 7, 1988 (pyrolysis of thin films of poly(phenylene oxadiazole) and Nishi et al., U.S. Pat. No. 4,959,281, issued Sep. 25, 1990 (carbon anodes produced by pyrolysis of selected furan resins). Anodes having a laminate structure consisting of a carbon molded article, made of carbon fiber or carbon powder, with lithium absorbed therein before being inserted into the secondary battery have also been used. Takahashi et al., U.S. Pat. No. 4,980,250, issued Dec. 25, 1990. Finally, carbonaceous anodes consisting of a multi-phase composition that includes (1) a highly graphitic carbon, (2) a substantially non-graphitic carbon, and (3) an electrically conductive filamentary material, such as carbon black, have been introduced. Fong, U.S. Pat. No. 5,028,500, issued Jul. 2, 1991.

Some of these prior art methods which endeavored to control electrode porosity did not produce quality electrodes because they invariably used binders, adhesives, or thermal plastics to convert carbon powders into porous sheets or plates. The use of these materials often actually degrades the utilization efficiency of the carbon electrodes and reduces the electrical conductivity of the electrodes, the latter phenomenon being caused by the particle-to-particle resistive contacts in such bonded composites.

Thus, despite some improvements in alkali secondary batteries, there remains a need for rechargeable batteries that are inexpensive, stable, easy to manufacture, and that have extended rechargeable lifetimes.

SUMMARY OF THE INVENTION

It is an object of the present invention to provide a rechargeable, long-life negative electrode for a lithium-ion secondary battery which demonstrates minimal dendritic deposition, high energy density, long charged-discharged cycle life, light weight, and high reliability.

It is another object to provide a method of synthesizing monolithic carbon foam electrodes through the control pyrolysis of polyacrylonitrile (PAN) polymer foam precursors wherein the temperature and atmospheric conditions in the early stages of pyrolysis are adapted to stabilize the pore structure in the polymer precursor.

These and other objects are accomplished with the inventive rechargeable electrode which comprises three-dimensional porous carbon structures having a network of cells separated from each other by walls and interconnected by holes through said walls. The cells have diameters in the range of approximately 0.1 to 100 µm. In addition, the carbon structures have a macroscopic density of less than approximately 1.0 g/cc and the carbon structures have randomly oriented domains shown by transmission electron microscopy to contain approximately 4 to 10 lattice planes extending approximately 20 to 50 Å in lateral extent. In one preferred embodiment of the carbon structures the X-ray diffraction spectrum of the carbon structures shows large $d_{002}$ lattice spacing in the order of 3.5 to 3.7 Å and Raman spectrum shows substantial peak areas at 1360 $cm^{-1}$ (disordered peak) and at 1580 $cm^{-1}$ (ordered peak). The ratio of the peak strengths was nearly equal in magnitude. The rechargeable electrode is uniquely suited for use as the anode in lithium-ion secondary batteries.

The inventive electrodes are fabricated from carbonizable polymer or copolymer, preferably acrylonitrile-based polymers such as PAN and acrylonitrile-based copolymers. With the inventive process, the microscopic, macroscopic, and microcrystalline structures of the carbon materials produced can be controlled simultaneously during the synthetic process. The carbon materials synthesized can be employed as monolithic, highly conductive, binderless electrodes with controlled porosity and high intercalation efficiency. Even when produced as powders, pellets, or cakes, the macrostructure can be adapted to optimize the mass transport of lithium ions to the carbon surface. The process also permits the control of gravimetric surface area during the carbon synthesis. This is advantageous in that it eliminates the need for grading and sieving of powders to obtain the appropriate gravimetric surface area fraction. Such procedures generally involve considerable waste of non-compliant samples.

BRIEF DESCRIPTION OF THE DRAWINGS

FIGS. 1 to 5 are graphs that present the lithium intercalation efficiency as a function of potential for five carbon foam electrodes.

FIG. 6 is a schematic diagram of a secondary battery with a lithium intercalated anode.

DESCRIPTION OF THE PREFERRED EMBODIMENTS

The present invention is based in part on the discovery that certain carbons typically produced as microporous carbon structures are uniquely suited for use as electrodes in alkali metal intercalation-type rechargeable batteries. The microporous carbon structures are synthesized by controlled pyrolysis of a carbonizable polymer or copolymer foam precursor. Preferably, the polymer comprises acrylonitrile-based polymers, such as polyacrylonitrile (PAN) and polymethylacrylonitrile, and acrylonitrile-based copolymers. However, other suitable carbonizable polymers, including cellulose, can be employed in the present invention. See U.S. Pat. Nos. 4,832,881, inventors Arnold, Jr. et. al., issued May 23, 1989, 4,832,870, inventors Clough et al., issued May 23, 1989, and 4,725,422, inventors Miyabayashi et al., issued Feb. 16, 1988, all of which are incorporated herein.

The process of fabricating the inventive microporous carbon structures comprises of first mixing the polymer with an organic solvent to form a gelled open-celled foamed structure. Suitable solvents include DMSO/ethylene glycol and N-ethylpyrrolidinone. Thereafter, the solvent-rich phase is removed thereby leaving a polymer foam precursor that has an open-cell foamed structure. The precursor is then thermally pretreated before being carbonized. See U.S. Pat. No. 4,832,881, inventors Arnold, Jr. et. al., which is incorporated herein. Pretreatment comprises of subjecting the foam precursor to hot oxygen or air for about 8 to 80 hours at temperatures in the range of about 180° C. to about 240° C. Carbonization comprises of heating the pretreated foam precursor to a temperature from about 600° C. to about 2000° C. for about 1 to 8 hours in the presence of an inert gas that is preferably flowing at approximately 1–2 L/min. Alternatively, carbonization can comprise of heating the polymer foam precursor in a vacuum. In both pretreatment and carbonization, it is understood that preferably the length of time that the foam is heated is inversely proportional to the process temperature so that the foam is heated for a longer period when the process temperature chosen is at the lower range and vice-versa.

In both the pretreatment and carbonization steps, the temperature of the gas can be increased (ramped) at rates adapted to control the microscopic, macroscopic, and microcrystalline structures of the carbonaceous materials produced. One feature of the inventive process is that by regulating the process conditions in the pyrolysis (pretreatment and carbonization) steps, the pore structure in the polymer precursor tends to be stabilized so that the pore structure survives the pyrolysis to carbon.

In one preferred procedure, thermal pretreatment comprises of the following sequence: (1) heating the polymer foam to a first elevated temperature of approximately 180° C. to 220° C. (preferably to about 200° C.) wherein the temperature of the polymer foam is raised at a rate of <2° C./min; (2) maintaining the first elevated temperature for about 24 to 60 hours (preferably for about 48 hours); (3) increasing the temperature of the polymer foam to a second elevated temperature of about 210° C. to about 240° C. (preferably to about 220° C.) wherein the temperature of the polymer foam is raised at a rate of <2° C./min; (4) maintaining the second elevated temperature for about 8 to 24 hours (preferably for about 16 hours); and finally (5) cooling the polymer foam to ambient temperature wherein the rate of cooling is <2° C./min.

Carbonization preferably comprises of the following sequence: (1) raising the temperature of the pretreated polymer foam to a first elevated temperature of approximately 800° C. to 1000° C. (preferably to about 1000° C.) wherein the temperature is increased at a rate of <5° C./min; (2) maintaining the first elevated temperature for about 0.5 to 2 hours (preferably for about 1 hour); (3) increasing the temperature to a second elevated temperature of 900° C. to 1200° C. (preferably to about 1100° C.) wherein the temperature is raised preferably at a rate of about 320 C./min; (4) maintaining the second elevated temperature for 6 to 10 hours (preferably 8 hours); and, finally, (5) cooling the foam to ambient temperatures wherein the temperature is lowered preferably at a rate of <5° C./min.

In carbonization, the cooling rate should generally not exceed 5° C./min in order to minimize thermally induced stresses for large parts. But in the case of powder processing, the rates may be considerably higher. Because of the large volumetric change which occurs on carbonization, specimen constraint may be necessary in order to maintain regular shapes if so desired. On rectilinear pieces, flat graphite plates can serve the restraint function. On irregular pieces, graphite rods or beads will serve the same function. During both pretreatment and carbonization, the heating (or ramping) rate preferably should not be less than 0.5° C./min. and the cooling rate preferably also should not be less than 0.5 ° C./min.

Examples 1–5 set forth preferred embodiments of the inventive process in which monolithic carbon foam electrodes are produced directly. If desired, the inventive process can be used to prepare suitable carbon powder, pellets, or cakes which can also be used as intercalation anodes. See Takahashi et al., U.S. Pat. No. 4,980,250, issued Dec. 25, 1990, which is incorporated herein.

EXAMPLE 1

A 10% solution of PAN was prepared by heating a mixture of PAN (MW 150,000) in dimethyl formamide (DMF) and ethylene glycol to approximately 150° C. The hot solution was cast into a glass vial. As the solution cooled, phase separation occurred with concomitant gel formation.

The solvent rich phase was exchanged with methanol, and the methanol was then extracted using supercritical $CO_2$. Thereafter, the resulting PAN foam was thermally pretreated in air inside a forced-air oven according to the following temperature program: (1) heating to 200° C. at a rate of <2° C./min, (2) holding at 200° C. for 48 hours, (3) raising the temperature to 220° C. at a rate of <2° C./min, (4) holding the temperature at 220° C. for 16 hours, and (5) cooling to room temperature at a rate of <2° C./min.

After pretreatment, the foam was carbonized under an inert atmosphere (argon gas, typically at a 1–2 L/min flow rate) in a temperature-programmed tube furnace. The temperature program was as follows: (1) increasing the temperature to 1000° C. at a rate of <5° C./min, (2) holding the temperature at 1000° C. for 1 hour, (3) raising the temperature to 1100° C. at a rate of about 3° C./min, (4) holding the temperature at 1100° C. for 8 hours, and (5) lowering the temperature to about 700° C. at a rate of <5° C./min. Below about 700° C. the furnace cooled to room temperature at a slower rate due to its large thermal mass.

EXAMPLE 2

A PAN gel was produced as in Example 1, except that a silicon mold was used instead of a glass vial. In this case the solvent rich phase was extracted with acetone for four days, with the acetone being exchanged each day. The acetone was then extracted with supercritical $CO_2$, and the resulting PAN foam bar was thermally stabilized and carbonized as in Example 1.

EXAMPLE 3

A 12% solution of PAN was prepared by heating a mixture of PAN in DMSO and ethylene glycol to about 155° C. BHT (butylated hydroxy toluene) was added to inhibit thermal oxidation during dissolution. The hot solution was cast into a silicone mold and permitted to gel as in Examples 1 and 2. The solvent was exchanged with methanol and the methanol was removed by supercritical $CO_2$. Thermal stabilization and carbonization were also conducted as in Example 1.

EXAMPLE 4

A 4% solution of PAN was prepared by heating a mixture of PAN in maleic anhydride and 0.06% LiBr under vacuum to about 155° C. The melt was poured into a hot, insulated pyrex dish, covered, and set on a 45° C. chill plate inside a pressure vessel. Nitrogen at 60 psig was applied during gelation and solidification. After 3.5 hours, the chill plate temperature was reduced to 26° C. and maintained at that temperature over night. The solvent was removed using vacuum sublimation. Thermal stabilization and carbonization were also conducted as in Example 1.

EXAMPLE 5

A 10% solution of PAN was prepared by heating a mixture of PAN in a solution of LiBr in N-ethylpyrrolidinone and ethylene glycol to about 180° C. Gelation, solvent exchange, extraction, thermal stabilization, and carbonization were conducted as in Example 2.

The resulting carbon foams from Examples 1 through 5 were "microcrystalline" with randomly oriented domains that contain 4–10 lattice planes extending only 20–50 angstroms in lateral extent as evidenced by transmission electron microscopy (TEM). The carbon foam typically has a macroscopic density of equal to or less than approximately 1.0 g/cc and preferably between 0.7 to 1.0 g/cc. X-ray diffraction spectrum of this carbon structure shows very broad $d_{002}$ lattice spacing in the order of 3.5 to 3.7 Å.

Raman spectrum of the microporous carbon structure showed substantial peak area at 1360 cm (disordered peak) as well as substantial peak area at 1580 $cm^{-1}$ (ordered peak). The ratio of the peak strengths (ordered v. disordered phase) was slightly less than 1; however, it is expected that in other embodiments of the microporous carbon structures, the ratio can be equal to or greater than 1.

Binders, adhesives, and thermal plastics may, however, be used to enhance mechanical characteristics or when powder processing is desirable. As is apparent, electrodes can be manufactured from the carbon foam or structure in any suitable configuration including monolithic structures, granules, and powders.

ELECTROCHEMICAL EVALUATION

Electrodes made from the inventive carbon foams were then tested for intercalation activity in a half-cell testing arrangement. The monolithic carbon blocks produced according to Examples 1–5 were machined into discs 1.0 cm in diameter and 0.1 cm thick. Each carbon disc was enclosed in a nickel screen and submerged in a 1.0 M $LiAsF_6$ solution with propylene carbonate as the solvent. Each carbon working electrode was polarized using a lithium metal auxiliary electrode. Potentials were controlled and measured versus a second lithium metal reference electrode. The potential dependent lithium intercalation efficiency was measured for each carbon by potentiostatically charging it at selected potentials in the range 0.6 V to 0.01 V versus lithium. After each charge the electrode was discharged potentiostatically at 1.5 V versus the lithium reference. Integration of the discharge current yielded the coulombic lithium intercalation efficiency at the corresponding charging potential. These measurements were made after electrochemical formatting and irreversible passivation of the carbon surface. The lithium intercalation efficiency is presented as a function of potential in FIGS. 1–5.

Although lithium intercalation efficiency and cycle ability was measured in 1.0 M $LiAsF_6$-propylene carbonate electrolyte, other electrolytes consisting of salts shown in Table 1 dissolved in a solvent (or mixture of solvents) shown in Table 2 could also have been used.

TABLE 1

Illustrative Supporting Electrolyte Salts for Secondary Lithium-Ion Batteries

| | | |
|---|---|---|
| $LiClO_4$ | $LiBF_4$ | $LiCF_3SO_3$ |
| $LiAsF_6$ | $LiAlCl_4$ | LiI |
| $LiPF_6$ | $LiB(C_6H_5)_4$ | LiBr |
| | | $LiN(CF_3SO_2)_2$ |

TABLE 2

Illustrative Solvents for Secondary Lithium-Ion Batteries

| | |
|---|---|
| propylene carbonate | 4-methyl-2-pentanone |
| ethylene carbonate | 1,2 dichloroethane |
| vinylene carbonate | dimethyl thioformamide |
| diethyl carbonate | sulfolane |
| dimethoxyethane (monoglyme) | trimethyl phosphate |
| diglyme | triethyl phosphate |
| triglyme | dimethylformamide (DMF) |

TABLE 2-continued

Illustrative Solvents for Secondary Lithium-Ion Batteries

| | |
|---|---|
| methyl formate | dimethylsulfoxide (DMSO) |
| γ-butyrolactone | tetrahydrofuran (THF) |
| acetonitrile | 2-methyl THF |
| proprionitrile | 1,4 dioxane |
| butyronitrile | anisol |
| benzonitrile | |

FIG. 6 is a cross-sectional view of a nonaqueous secondary battery constructed with the inventive microporous carbon anode 10 having lithium intercalated therein. The cathode 20 may be fabricated from a variety of rechargeable materials, including, but not limited to, metal oxides, chalcogenides of transition metals, or conjugated polymers. Preferred cathode materials include lithiated manganese oxides ($Li_xMnO_2$, $Li_xMn_2O_4$), lithiated cobalt oxide ($Li_xCoO_2$), lithiated vanadium oxides ($Li_xV_zO_5$, $Li_xV_6O_{13}$), lithiated nickel oxide ($Li_xNiO_2$), and sulfides of iron, cobalt, molybdenum, and titanium ($FeS_2$, $CoS_z$, $MoS_2$, and $TiS_z$).

The lithium salt used for the electrolyte solution may be any one including those in Table 1. Usually, one kind of lithium salts is used, but two or more kinds may be used in mixture. The lithium salt is dissolved in the solvent (see Table 2) to provide the electrolyte solution of the secondary battery. One solvent or a mixture of these organic solvents may be used. The concentration of the lithium salt in the solution is usually 0.5 to 1.5 mol/l and preferably 1.0 to 1.5 mol/l.

The electrolyte solution containing lithium salt is usually impregnated into a separator 30 that is positioned between the electrodes to ionically connect them. The thickness of the separator should be sufficient to prevent an internal short circuit between the anode and the cathode.

The secondary battery in the present invention may include current collectors as in conventional batteries. For example, metals such as nickel, copper, aluminum, or stainless steel may be used as the cathode current collector 21; and nickel, copper, or stainless steel may be used as the anode current collector 11. The anode, cathode, and separator (including the electrolyte) are housed in a casing 40 that is made of insulative material. Terminals 50 and 60 are attached to the anode and cathode current collectors, respectively. The terminals are made of metal such as nickel, copper, aluminum, or stainless steel.

When a load is connected to the anode and the cathode, a discharge current begins to flow through the battery and the load. It is hypothesized that $Li^+$ ions are freed from the microporous carbon in the anode and are conducted by the electrolyte across the separator to the cathode. The ions then react with the cathode. Once all the lithium in the anode has been conducted to the cathode or the cathode has reached its maximum capacity of lithium, the battery reaches the end of its discharge life. It is recharged by reversing the current flow within the battery. It is believed that the $Li^+$ ion is then released from the cathode and conducted back to the anode where it is reintroduced to form lithium intercalated carbon.

It is to be understood that while the invention has been described above in conjunction with preferred specific embodiments, the description and examples are intended to illustrate and not limit the scope of the invention, which is defined by the scope of the appended claims.

It is claimed:

1. A lithium-ion secondary battery electrode comprising:

a three dimensional, monolithic, microporous carbon structure having a lithium intercalation efficiency of more than 50%, a macroscopic density of about 0.7 to about 1.0 g/cc, randomly oriented domains shown by transmission electron microscopy to contain approximately 4 to 10 lattice planes extending approximately 20 to 50 Å in lateral extent, a network of cells having diameters in the range of approximately 10 to approximately 100 micrometers within the structure, the cells separated from each other by walls and interconnected by holes through the walls, wherein said carbon structure is prepared by a process comprising the steps of:

(a) preparing a polymer precursor having an open-celled structure;

(b) pretreating the polymer precursor wherein pretreatment comprises gradually heating the polymer precursor to an elevated temperature of about 240° C in the presence of oxygen; and (c) carbonizing the pretreated polymer precursor in an inert gas in order to preserve desirable pore structure thereby improving the electrochemical efficiency of the lithium-ion secondary battery electrode, by gradually heating said pretreated precursor to a temperature of about 1200° C., and gradually cooling said pretreated precursor, said heating and cooling steps of said pretreated precursor being at a rate not exceeding 0.5 C./min.

2. A lithium-ion secondary battery electrode as defined in claim 1 wherein the polymer precursor is a gelled polymer foam.

3. A lithium-ion secondary battery electrode as defined in claim 1 wherein the step of carbonizing further includes the step of grinding whereby a granular or powdered carbon foam is produced.

4. A lithium-ion secondary battery electrode as defined in claim 3 prepared by a process that comprises adding binders, adhesives or thermal plastics to said granular or powdered carbonized foam.

5. The lithium-ion secondary battery electrode as defined in claim 1 wherein the electrode is in a granular or powder form.

6. The lithium-ion secondary battery electrode as defined in claim 1 wherein lithium is electrochemically intercalated into said three dimensional microporous carbon structure.

\* \* \* \* \*